July 27, 1965

I. W. LAKIN ETAL 3,197,187

CONVERTER TILTING DRIVE AND TORQUE ASSIST

Filed Nov. 7, 1962

INVENTORS.
Ira W. Lakin and
Richard P. Krause.

BY

Green, McCallister + Miller

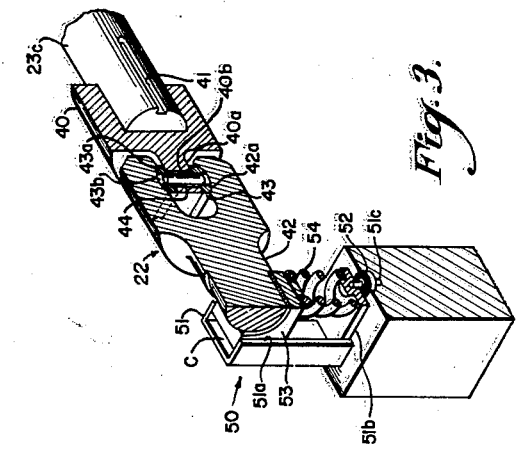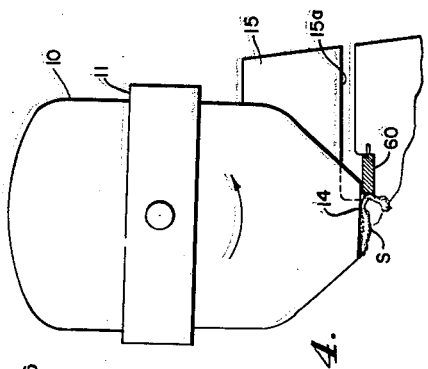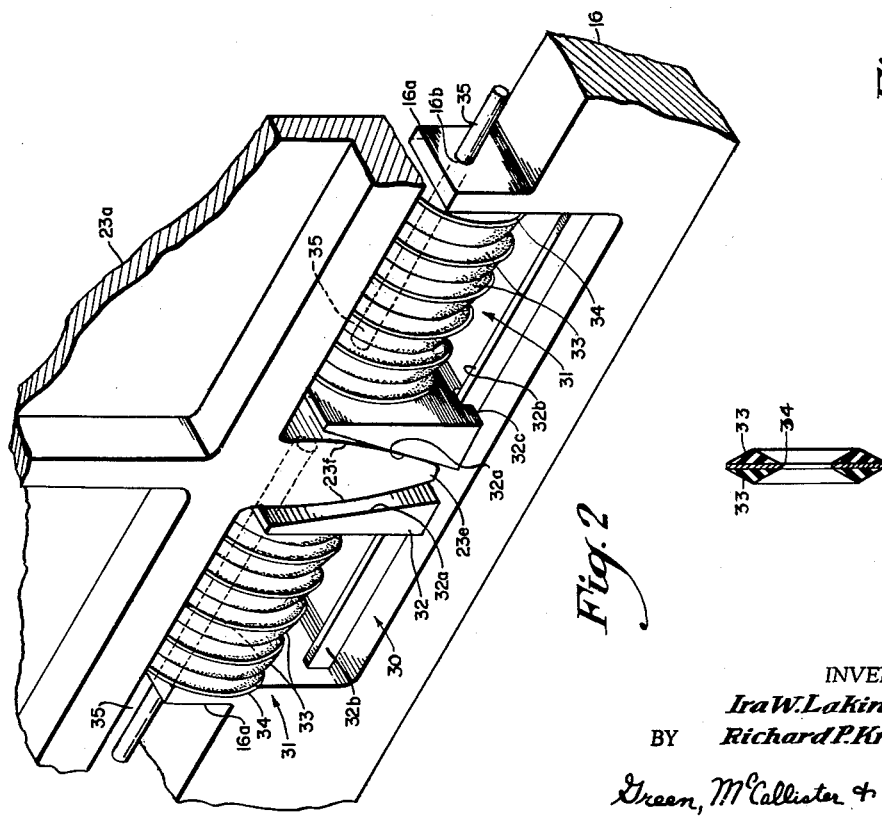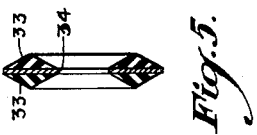

United States Patent Office 3,197,187
Patented July 27, 1965

3,197,187
CONVERTER TILTING DRIVE AND
TORQUE ASSIST
Ira W. Lakin, Volant, and Richard P. Krause, Butler, Pa.,
assignors to Pennsylvania Engineering Corporation,
New Castle, Pa., a corporation of Pennsylvania
Filed Nov. 7, 1962, Ser. No. 235,964
16 Claims. (Cl. 266—36)

This invention relates to improved driving mechanism for turning or rotating a furnace vessel, such as a converter, about a horizontal axis for various phases of its operation. A phase of the invention relates to an improved transmission construction by which a furnace vessel is driven for a major portion of its turning or rotational operations and to a novel torque assist mechanism for turning or rotating the vessel with a high force during a deskulling operation.

In the steel making art, furnace vessels, such as oxygen and Bessemer converters, are rotatably supported on trunnions or stands by suitable trunnion shafting. Drive means (usually electric motors) are provided for rotating or tilting the vessels to different positions for their various operational phases, such as loading, refining, and pouring. In the usual converter installation, a speed reducing transmission is provided between the drive means and a trunnion shaft connected to the converter. Part of the transmission (usually a large bull gear) is mounted directly on the trunnion shaft and other parts of the transmission are externally supported from stationary structure, such as the shop floor. The gears employed in such a speed reducing transmission must be constructed to withstand the large forces (up to about two million pounds) required to tilt a loaded converter vessel about its axis.

In existing converter installations, the transmission gears must withstand even greater loads, since the tilting mechanism is employed to rotate the converter vessel past a deskulling tool that rips or shears metal deposits known as skull from the vessel lip. In addition to ordinary turning forces, the transmission gears in the ordinary converter drive mechanism must withstand the frequent shock loadings that occur when tons of scrap are dumped against the internal side walls of the converter during loading. Frequent shock loadings will cause failure of gear teeth and other transmission elements by fatigue, even although the magnitude of the repeated stress is considerably lower than the ultimate structural strength of the elements.

In a usual converter installation, the transmission serves a further function of allowing relative movement between the converter vessel (which expands and contracts with various phases of its operation) and the stationary floor-supported drive means. Accordingly, the transmission gears are usually designed to permit lateral or axial relative movement between their intermeshing teeth.

Transmission elements currently in use are necessarily large, coarse and inaccurate due to the high safety factors required to anticipate the complex stresses made possible from the multitude of functions mentioned above. Existing transmissions thus must operate with a high degree of slop or backlash. Backlash in the transmission aggravates the design problem further by permitting a momentum shock to be applied to the transmission elements, thus furthering the possibilities of fatigue failure in the gear teeth.

Accordingly, it has been an object of our invention to investigate and solve the problems existing in power transmissions for tilting furnace vessels such as converters;

Another object of our invention has been to provide a compact and reliable converter rotating system that will efficiently perform the functions of vessel tilting, shock-energy absorption, and deskulling;

Another important object of our invention has been to provide an improved tilting transmission that will permit the use of finer, more precise, transmission elements;

A further object of our invention has been to provide an improved power coupling that is compatible with a preferred shock-energy absorption means;

A further important object of our invention has been to provide a torque assist mechanism to supply additional turning force during a skull removing or shearing-off operation;

A still further object of our invention has been to provide control procedure and mechanism for operating the torque assist mechanism only at times when additional deskulling torque is required;

A still further important object of our invention has been to provide a control method and mechanism that interrelates the operation of the main tilting power source with the operation of a torque assist mechanism.

These and other important objects of our invention will appear to those skilled in the art upon reading and understanding the following description of our invention.

An important aspect of our invention relates to the provision of a power transmission for tilting a furnace vessel, that includes a driven gear mounted on a trunnion shaft of the vessel, and a driving gear that is supported from the trunnion shaft by means that effectively prevents axial or lateral displacement between the gear teeth. Thus, both the driving gear and the driven gear are movably supported with respect to the stationary floor mounted drive means.

We have found that by including a flexible coupling between the drive means or motor and the driving gear of the transmission, the transmission will be permitted a substantial degree of freedom to move both axially and angularly. We have recognized that angular movement of the transmission could be opposed by suitable energy absorbing means to lessen shock loadings on the transmission that occur during charging of the vessel. Floating couplings usually employed in converter drive transmissions, such as that shown in McFeaters Patent No. 2,483,017 issued September 27, 1947, will permit only a relatively small angular displacement between the ends of the coupling (about ½° to 3° maximum); this, we have found does not provide sufficient movement for effective shock absorption. We have discovered that a flexible coupling having a pair of spaced universal joints will transmit the high torques required to tilt a loaded vessel and also will permit a considerable degree (over 6°) of angular misalignment or movement between the drive means and the driving gear.

Our invention optimizes the arc of available shock-absorbing movement permitted by the flexible coupling by employing a shock-absorbing device that has a rapidly-increasing, non-linear energy-resistance characteristic. In this connection, the device may be of a butyl, rubber-cushion type. This characteristic of our shock-absorbing device permits a high degree of energy absorption movement of the fatigue-causing small-but-frequent shocks, while absorbing a comparatively small amount of the occasional large shocks that can be withstood by the shear strength of the transmission structure. Such a non-linear energy resistance characteristic provides all of the practical shock-absorption required for protecting the transmission, while limiting the degree of displacement necessary to achieve such shock absorption. Our shock absorbing device also has an advantageous low-bounce characteristic that stabilizes the converter vessel upon loading and further reduces the chance of transmission fatigue failure.

Another important aspect of our invention relates to the use of two symmetrically-located drive input means that divide the total turning torque to reduce the repeated turning force which the individual gear teeth must withstand and thereby increase the precision of the transmission. Furthermore, the reliability of the system is enhanced by dividing the driving means into two separate units, since each unit will be capable of operating under temporary overload conditions as may be necessary upon failure of one unit during a processing cycle.

A further aspect of our invention relates to a method and apparatus for removing deposits or accumulations, such as skull, from the lip of a rotatable furnace vessel. We have found that an extremely high force (or torque) is required to rip or shear-off skull from a vessel; however, since a vessel being deskulled is not processing metal, the speed of deskulling is of minor importance. Accordingly, we have devised a low-energy high-force torque assist mechanism for rotating the vessel past a stationary deskulling tool. Such method of removing the skull further contributes to the precision of the main tilting drive by further reducing the force requirements thereof. We have also devised a control system that detects a deskulling condition to initiate operation of the torque assist mechanism. In an overall system, such as disclosed herein, we have found that an overload condition of the main tilting drive means or motor provides a convenient indication that a deskulling operation has commenced.

A specific embodiment of our invention is illustrated in the accompanying drawings of which:

FIGURE 2 is an enlarged fragmental perspective view of our improved torque resisting and shock absorbing apparatus;

FIGURE 3 is an enlarged, partially broken-away, perspective view of a floating coupling employed in carrying out our invention;

FIGURE 4 is a fragmental side view of the converter vessel shown in FIGURE 2, illustrating the relationship between the vessel and a deskulling tool during a deskulling operation; and FIGURE 5 is an enlarged vertical cross-sectional view of a rubber cushion employed in our torque resisting and shock absorbing apparatus shown in FIGURE 2.

Figure 1:
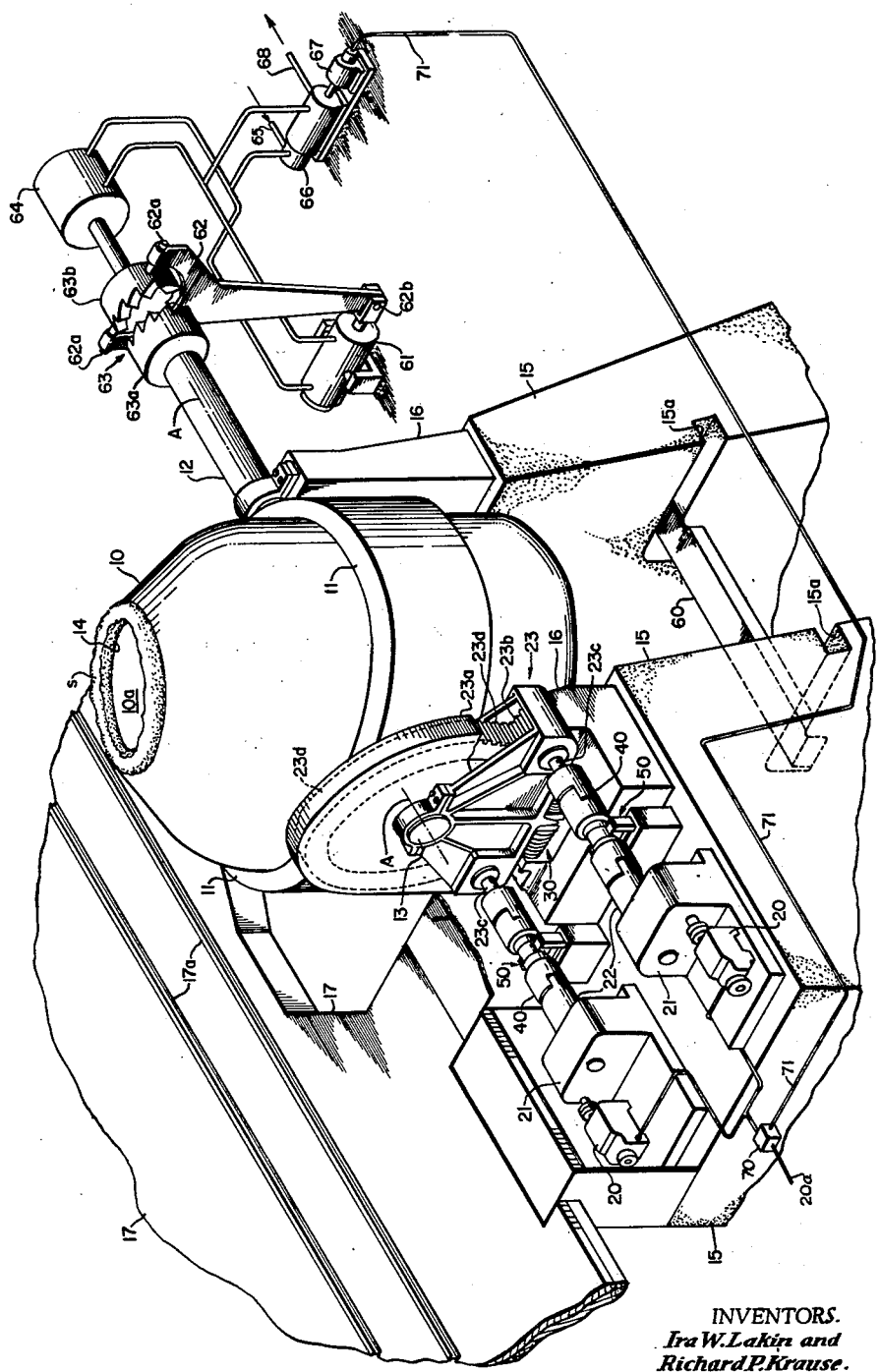
FIGURE 1 is a perspective view of an oxygen converter installation showing our improved main tilting drive mechanism and our novel torque assist mechanism.

In FIGURE 1 there is show a furnace vessel 10 such as a Bessemer of oxygen converter that is supported by a trunnion ring 11. The trunnion ring 11 is provided with a pair of diametrically-opposed, outwardly-extending trunnion shafts 12 and 13 which establish a rotational axis A—A about which the vessel 10 may be turned. The vessel 10 has a rim portion or lip 14 at its upper end that defines a loading and pouring opening, open portion or mouth 10a. The rim 14 will accumulate a deposit S of solidified material, commonly called skull, during the metal refining operations of the vessel.

In the installation shown in FIGURE 1, the vessel 10 is supported from a sub-floor or foundation 15 by a pair of bearing stands 16 which rotatably mount or journal the trunnion shafts 12 and 13. The trunnion axis A—A is advantageously located just below a main or operation floor 17 that provides a vessel servicing area which may contain rails, tracks or other servicing equipment guide means 17a. Cars (not shown) loaded with scrap and other materials are moved on the tracks 17a up to the vessel mouth 10a when the vessel 10 is in a tilted position. It will thus be seen that equipment for servicing the interior of the vessel and machinery for tilting the vessel are located on different levels to thereby conserve space and protect the tilting machinery from dirt, flying metal particles and debris.

The main mechanism for rotating the converter 10 about axis A—A is shown to the left of FIGURE 1. This mechanism comprises a power source or drive means such as a pair of electrical motors 20 that each drive a separate primary speed reducing gear box 21, a flexible power shaft or coupling 22, and a secondary gear assembly or speed reducing transmission 23. The transmission 23 includes a housing, casing, cage, or pinion support member 23a that is rotatably mounted on the trunnion shaft 13, at least one, and preferably two or more pinion or driving gears 23b having input shafts 23c, and a driven gear or bull gear 23d that is securely mounted on the trunnion shaft 13 and rotates within the casing 23a as it is driven by the pinion gears 23b. The entire transmission 23 will thus be carried laterally with any expansion or movement of the trunnion shaft 13, such as might be caused by thermal expansion of the vessel 10 and the trunnion shaft 11.

It will be noted that the casing 23a is mounted for rotary or turning movement on or with respect to the trunnion shaft 13. This is true, although other means independent of the shaft is employed to limit, resist or restrain such movement, see the means of FIGURE 2.

It will be seen that since the casing 23a is supported for relative rotation with respect to its associated trunnion shaft 13, it will tend to planetate or rotate around the bull gear 23d. Also, as tons of scrap are dumped into the vessel from a car on the tracks 17a, the vessel will be jolted about its rotational axis and will tend to violently rotate the transmission 23. To prevent planetation of the transmission during tilting and excessive repeated shock loadings incident to charging, we provide an end-positioned, transversely-positioned, torque-resisting, energy absorbing mechanism 30 that is more clearly shown in the detail view of FIGURE 2.

The mechanism 30 includes a pair of opposed energy-absorbing means or buffers 31 that abut a pair of upstanding, end flanges or abutments 16a that are integrally-formed with or otherwise securely connected to the stand 16 or other stationary structure. The buffers 31 each include an end-positioned inner pressure or bearing plate 32, an assembly of several serially-aligned, resilient, cooperating, vibration and abrasion resisting, (preferably of a butyl resin type) rubber-like cushions 33 having alternately-interspaced steel plates 34 therebetween, guiding means such as a transverse shaft or rod member 35 that extends through a cooperating hole 16b in the upstanding flanges 16a to maintain the axial alignment of the rubber cushion assembly, and tracks 32b that cooperate with slots 32c to prevent rotational displacement of the assembly. As more clearly shown in FIGURE 5, the rubber cushions 33 are somewhat doughnut-shaped and have triangular cross-sections. The pressure plates 32 have an inwardly-facing upwardly-outwardly-diverging bearing surface 32a for engaging a downwardly or outwardly-extending intermediate flange part or tooth 23e of the casing 23a. The downwardly-extending flange part 23e has opposed curved and outwardly or downwardly-converging surfaces 23f that bear upon the diverging bearing surfaces 32a of the pressure plates 32. The surfaces 23f and 32a are constructed to cooperate substantially like the tooth of a circular gear meshing with a rack or gear of infinite curvature to maximize the force transmitting efficiency therebetween. We prefer to prestress the rubber cushion assemblies to approximately ½ of their total available displacement to provide an optimum energy absorption and torque resistance characteristic.

By our selection of a resilient, abrasion and vibration resistant, rubber-like cushions 33 for use in the buffers 31 (see FIGURES 2 and 5), our torque-resisting apparatus 30 has an energy-displacement characteristic that permits a comparatively large deflection for small shock loadings or jolts, and a progressively smaller relative deflection for larger shock loadings. This characteristic is particularly appropriate for use with the converter drive mechanism, as the small but frequent shock loadings encountered during charging of the vessel are more detrimental to the transmission parts, due to fatigue considerations, than are the occasional large shock loadings. Also, we have found that it is necessary to limit the displacement available for energy absorption to that which can be accommodated by the flexible coupling 22 (see FIGURE 1).

While the flexible coupling 22 employed in our converter drive mechanism permits considerably greater angular displacement than prior flexible couplings, such as that shown in the McFeaters Patent No. 2,483,017 issued September 27, 1947, there is a still practical limit to the range of angular displacement through which it can properly operate.

In addition to the energy-displacement characteristic derived from our rubber cushions 33, a butyl-type rubber provides a high degree of energy absorption that results in a remarkably low bounce response to shock loading. As fatigue of the transmission gear teeth of pinion 23b and the bull gear 23d represents the most critical strength consideration of the system, a low bounce or stress recurrence characteristic is of utmost importance. Thus, it will be seen that our torque-resisting apparatus 30 will reduce the intensity of a shock loading caused during charging of the vessel, and will also reduce the number of vibrational recurrences of a shock loading applied. Those skilled in the art will appreciate the simplicity of our apparatus 30 that provides the complex characteristics necessary to the success of our precision drive installation.

The details of the flexible coupling 22 that permit sufficient angular displacement of the casing 23a to make shock absorption practical, are illustrated in FIGURE 3. As both ends of the coupling are identical, only one end is illustrated. The coupling 22 has a pair of end fittings or hubs 40 that are provided with means, such as a longitudinal keyway 41, for securely-receiving shafting from the primary gear box 21 and the pinion gear 23b (see FIGURE 1). A floating shaft 42 has a pair of end hub portions that are positioned between the end fittings 40 and are connected to the end fittings by universal-joint-like connecting means. A tongue or flange portion 40a of each end fitting 40 receives a pair of removable bronze shoes or bearing members 43. The bearing members 43 provide an outwardly-facing, convexly-rounded, surface 43a that rotatably engages complementary, concavely-rounded, surface portions 42a of the associated hub portion of the floating shaft 42.

The bearing members 43 each have a centrally-located bore or pin-receiving portion 43b that is approximately aligned with an enlarged open portion or longitudinal expansion gap 40b in the flange portion 40a. A pin or pivot member 44 connects the floating shaft 42, the bearing members 43 and the end fitting 40 into a universal-joint-like coupling that will permit a substantial degree of longitudinal as well as angular freedom. Referring again to FIGURE 1, it will be recognized that longitudinal freedom of movement of the shaft 42 is necessary to accommodate lateral or sidewise movement of the transmission casing 23a which occurs upon thermal expansion of the vessel 10.

The rounded outer surfaces 43a of each bearing member 43 permits a sidewise sliding movement of the floating shaft 42, which movement might result in an accidental complete separation of the floating shaft 42 from the end fitting 40. Accordingly, we have provided a carrier mechanism or means 50 (see FIGURES 1 and 3) for maintaining the floating shaft 42 at a substantially constant height or elevation, thereby preventing separation of the various coupling elements. The carrier mechanism 50 (see FIGURE 3) has a U-shaped or channel frame 51 that has a pair of spaced channel sections or track portions 51a extending upwardly from opposed ends of a base plate or table portion 51b. A shaft or pivot portion 51c is securely-connected to the frame base plate 51b and is rotatably supported in suitable floor-mounted bearing means 52 to thereby permit the frame 51 to pivot about a vertical axis.

The floating shaft 42 is rotatably-held by a bearing block or sleeve part 53 that is guided vertically and horizontally by the track portion 51a. A spring or other resilient means 54 supports the sleeve 53 and hence the shaft 42 at a substantially constant elevation on the base plate 51b. Clearance c is provided between the frame 51 and opposed ends of the bearing block 53 to permit sidewise or lateral motion of the block and thus of the shaft 42. It will be seen that the floating shaft 42 can move in all of the directions necessary to permit angular and longitudinal displacement of a casing 23a, as required for effective power transmission and proper operation of the energy-absorbing mechanism 30.

As has been mentioned above, skull S (see FIGURE 1) that may consist of a deposit of metal, metal oxides and other materials, will accumulate on the vessel lip 14 during various phases of the refining operation. The skull S must be periodically removed so as not to interfere with loading and pouring the metal charge to and from the vessel 10. FIGURES 1 and 4 show means for removing the skull S comprising a rigid knife, bar or deskulling tool 60. The sub-floor portions 15 each have elongated slots or open portions 15a formed therein for removably-receiving the tool 60 when deskulling is required. We prefer to withdraw the bar 60 when it is not in use to avoid any interference with other movements of the vessel 10 and to avoid the accumulation of dirt and metal spatterings on the tool.

It has heretofore been the practice to use the main converter tilting mechanism for also rotating the vessel lip past the shearing tool used for removing the skull from the lip. A tilting drive that is capable of developing sufficient torque to perform such a skull shearing operation is, however, considerably oversized for the ordinary operational tilting operations which constitute its primary function. However, oversizing of the tilting drive for deskulling purposes tends to defeat at least some of the advantages of our transmission and divided power source construction, such as the minimizing of necessary force capacity of the gear teeth and drive motor means to increase the precision and smoothness of operation of the drive. Accordingly, we have devised an additional tilting drive mechanism that operates only during a deskulling operation to rotate the vessel lip 14 past the bar 60.

As shown in the right-hand portion of FIGURE 1, the additional drive consists of a high-force, low-energy motor, such as a hydraulic jack or fluid-piston-cylinder unit 61. The jack 61 is operatively connected for rotating the vessel 10 by a lever arm or torque bar 62 and a clutch or coupling 63 that can be selectively-operated to transmit torque to the trunnion shaft 12.

The clutch 63 includes a first means or plate 63a that is securely connected to the trunnion shaft 12, and a second means or plate 63b that is carried in a longitudinal or axial direction by a fluid-actuated or other motor means 64. The clutch plates 63a and 63b have mutually complementary faces that are preferably toothed or serrated to interfit and transmit torque with a high efficiency. The torque arm 62 is bifurcated or forked at its upper or extending end and connected to the clutch plate 63b by a pair of diametrically-opposed pins 62a that permit the torque arm 62 to rotate slightly about an axis that is perpendicular to the trunnion axis A—A. A U-shaped and pivot pin connection 62b between the torque arm 62 and the piston shaft of the jack 61 is constructed to permit rotation of the torque arm 62 about the pins 62a as well as to permit the arm 62 to turn or slightly rotate about the trunnion axis A—A.

While it is possible to control the operation of the auxiliary drive by various means, such as a time-schedule of vessel operation or by visual observation of the vessel as the lip 14 approaches the deskulling bar 60 (using either an operator or an electric eye), we prefer to detect the overload condition of the drive motors 20 which occurs when the skull S engages the deskulling bar 60. Such overload condition will be accompanied by a sharp increase in electrical current load or demand by the motors 20 through the power lines 20a that can be sensed by a current-responsive means, ammeter or detector 70. The detector 70 produces a signal (closes a switch) to transmit energizing electrical current through means, such as electric cable 71, to the control system shown in the right-hand portion of FIGURE 1. The jack 61 and the clutch actuator 64 both receive motive fluid from a common source, as represented by a conduit or fluid pressure line 65. A control valve 66 is operated by a solenoid or other signal-responsive means 67 to connect the clutch actuator 64 and the power jack 61 simultaneously to either the supply conduit 65 or to a drain or low pressure conduit 68 in response to the signal received from wiring 71.

During normal operation of the vessel 10, the clutch actuator 64 and the jack 61 are connected to the drain conduit 68 and held in their inoperative or non-extended position (shown in FIGURE 1) by suitable spring or resilient means, not shown.

When the deskulling tool 60 is in place (as shown in FIGURE 5) and the vessel 10 is rotated or tilted by the main driving mechanism, including the motors 20, such that the skull S engages the deskulling tool 60, the motors 20 will become overloaded, slow-down, and draw a high current in the line 20a. The means 70 will detect the increase in current and transmit the energizing current through electrical cable 71 to solenoid 67, calling for operation of the auxiliary drive by the jack 61. The control valve 66 will thereupon be actuated by the solenoid 67 to admit pressure fluid from the supply line 65 to the clutch actuator 64, which will move the clutch plate 63b into operative clutching engagement with the clutch plate 63a. The valve 66 will also transmit pressure fluid to the jack 61, causing it to extend and rotate the arm 62, the clutch 63, and the vessel 10 counterclockwise for the short distance necessary for the vessel lip 14 to traverse the deskulling tool 60, as shown in FIGURE 4.

When the skull has been removed, the overload condition of the motors 20 will no longer exist and the current-responsive means or ammeter 70 will move to a position to open a switch and de-energize the cable 71 and solenoid 67, causing the valve 66 to return to its original position at which it connects the clutch actuator 64 and the power jack 61 to the drain conduit 68, permitting them to return to their inoperative positions. The deskulling operation is thus completed and the vessel 10 is prepared for further metal refining operation.

From the foregoing description of a specific embodiment of our invention, those skilled in the art will recognize that we have provided an improved converter drive mechanism that is capable of a smooth, efficient operation resulting from our novel inter-relation of transmission support structure, energy absorption and torque-resisting structure, flexible couplings, and deskulling torque assist mechanism. The smooth operation of our device is made possible by the precision gearing that is designed only for rotating the vessel 10 and not for absorbing shock, thermal expansion or sidewise displacement, or the high forces accompanying a deskulling operation. The motors 20 are small in size due to the division of rotating motive power, shock absorbing means 30, and the provision of an auxiliary drive for producing the high torque required during deskulling.

Furthermore, we have provided an auxiliary deskulling drive that is useful, not only in a system employing our improved tilting drive mechanism, but will be a useful addition to any vessel drive system requiring the short torque assist for deskulling or other minor, high-force-requirement movements.

Having thus described our invention, we claim:

1. In metal refining apparatus having a furnace vessel provided with trunnion shafts turnably-mounting it on a stand, an improved vesel tilting mechanism comprising: speed reducing transmission means for transmitting rotative power to the vessel, said transmission means having a casing that is mounted for turning movement on one of the trunnion shafts and having at least one input shaft that is rotatably-carried by said casing, drive means for providing a source of rotative power, flexible coupling means connecting said drive means with said input shaft, means for resisting turning movement of said casing on said one trunnion shaft, and said last-mentioned means having stationary abutment means and vibration-resistant cushion means operatively-positioned between a portion of said casing and said stationary abutment means.

2. In a metal refining apparatus having a furnace vessel provided with trunnion shafts turnably-mounting it on a stand, an improved vessel tilting mechanism comprising: speed-reducing transmission means for transmitting rotative power to the vessel, said transmission means having a casing that is mounted for turning movement on one of the trunnion shafts and having at least one input shaft that is rotatably-carried by said casing, drive means for providing a source of rotative power, flexible coupling means connecting said drive means with said input shaft, means for resisting turning movement of said casing on said one trunnion shaft, said last-mentioned means having a flange that is securely connected to said casing and that extends outwardly therefrom, a pair of stationary abutments aligned with and spaced from opposed sides of said flange, a pair of energy-absorbing means positioned between said flange and each of said stationary abutments, and each of said energy-absorbing means having a group of cooperating vibration-resistant cushions.

3. In metal refining apparatus having a furnace vessel provided with trunnion shafts turnably-mounting it on a stand, an improved vessel tilting mechanism comprising: speed reducing transmission means for transmitting rotative power to the vessel, said transmission means having a casing that is mounted for turning movement on one of the trunnion shafts and having at least one input shaft that is rotatably-carried by said casing, drive means for providing a source of rotative power, flexible coupling means connecting said drive means with said input shaft, means for resisting turning movement of said casing on said one trunnion shaft, said last-mentioned means having a flange that is securely-connected to said casing and that extends outwardly therefrom, said flange having opposed gear-tooth-like curved surfaces, a pair of stationary abutments aligned with and spaced from said flange, a pair of pressure plates operatively engaging said opposed curved surfaces in a gear-and-rack-type relationship, and rubber-like cushion energy-absorbing means positioned between each of said pressure plates and respective ones of said pair of stationary abutments.

4. In apparatus as defined in claim 3, further means for establishing a substantially linear path for said pressure plate.

5. In metal refining apparatus having a furnace vessel provided with trunnion shafts turnably-mounting it on a stand, an improved vessel tilting mechanism comprising: speed reducing transmission means for transmitting rotative power to the vessel, said transmission means having a casing that is mounted for turning movement on one of the trunnion shafts and having at least one input shaft that is rotatably-carried by said casing, drive means for providing a source of rotative power, flexible coupling means connecting said drive means with said input shaft, said flexible coupling means having first and second end fittings and a floating shaft positioned therebetween, said first end fitting being securely-connected to said drive means, said second end fitting being securely connected to said input shaft, first and second bearing plate means, means for supportingly-connecting said first and second bearing plate means respectively to said first and second end fittings to permit angular and axial movement therebetween, said floating shaft having bearing portions adjacent each of its ends that cooperatively engage said bearing plate means, and means for resisting turning movement of said casing on said one trunnion shaft, said last-mentioned means having stationary abutment means, and cushion means having the characteristics of a butyl type resin operatively-positioned between a portion of said casing and said stationary abutment means.

6. In apparatus as defined in claim 5 wherein separate means is provided for maintaining said floating shaft within a limited range of positions to prevent accidental separation of said floating shaft from said end fittings.

7. In metal refining apparatus having a furnace vessel provided with trunnion shafts turnably-mounting it on a stand, an improved vessel tilting mechanism comprising: speed-reducing transmission means for transmitting rotative power to the vessel, said transmission means having a casing that is mounted for turning movement on one of the trunnion shafts and having a pair of spaced input shafts that are rotatably-carried by said casing, a pair of motors for providing a source of rotative power, flexible coupling means connecting said motors with said input shafts, means for resisting turning movement of said casing on said one trunnion shaft, and said last-mentioned means having stationary abutment means and rubber-like cushion means operatively-positioned between a portion of said casing and said stationary abutment means.

8. In metal refining apparatus having a furnace vessel provided with trunnion shafts turnably-mounting it on a stand, an improved vessel tilting mechanism comprising: drive means for providing a source of rotative power, means for transmitting said rotative power to one of the trunnion shafts, and rubber-like cushion means operatively associated with said transmitting means for absorbing shock loading imposed upon the vessel.

9. In metal refining apparatus having a furnace vessel provided with trunnion shafts turnably mounting it on a stand and a lip portion that accumulates skull, an improved vessel tilting mechanism comprising: speed reducing transmission means for transmitting rotative power to the vessel, said transmission means having a casing that is mounted for turning movement on one of the trunnion shafts and having at least one input shaft that is rotatably-carried by said casing, main drive means for providing a source of rotative power, flexible coupling means connecting said drive means with said input shaft, means for resisting turning movement of said casing on said one trunnion shaft, said last-mentioned means having stationary abutment means and rubber-like cushion means operatively positioned between a portion of said casing and said stationary abutment means, a stationary tool for removing skull from the vessel lip, torque assist means operatively associated with one of the trunnion shafts for rotating the vessel lip portion past the stationary tool to shear the skull from the vessel lip portion, and means responsive to an operational condition of said main drive means for controlling the operation of said torque assist means.

10. Apparatus as defined in claim 8 wherein, the operational condition of said main drive means is an overload condition, and said last-mentioned means has current-load-sensing means.

11. In metal refining apparatus having a furnace vessel provided with trunnion shafts turnably-mounting it on a stand and a lip portion that accumulates skull, an improved vessel tilting mechanism comprising: speed reducing transmission means for transmitting rotative power to the vessel, said transmission means having a casing that is mounted for turning movement on one of the trunnion shafts and having at least one input shaft that is rotatably-carried by said casing, main drive means for providing a source of rotative power, flexible coupling means connecting said drive means with said input shaft, means for resisting turning movement of said casing on said one trunnion shaft, said last-mentioned means having a flange that is securely connected to said casing and that extends outwardly therefrom, said flange having opposed gear-tooth-like curved surfaces, a pair of stationary abutments aligned with and spaced from said flange, a pair of pressure plates operatively-engaging said opposed curved surfaces in a gear-and-rack-type relationship, rubber-like cushion energy-absorbing means positioned between each of said pressure plates and respective ones of said pair of stationary abutments, a stationary tool for removing skull from the vessel lip portion, torque assist means operatively-associated with one of the trunnion shafts for rotating the vessel lip portion past the stationary tool to shear the skull from the vessel lip portion, and means responsive to an operational condition of said main drive means for controlling the operation of said torque assist means.

12. In metal refining apparatus having a furnace vessel provided with trunnion shafts turnably mounting it on a stand and a lip portion that accumulates skull, and having a tool adapted to be positioned immediately adjacent the rotative path of the vessel, and improved vessel tilting mechanism comprising: drive means for providing a source of rotative power, means for operatively-connecting said drive means with one of the trunnion shafts for transmitting rotative power to the vessel for a major portion of its rotative operation, and torque assist means operatively associated with at least one of the trunnion shafts for rotating the vessel lip past the tool.

13. In metal refining apparatus having a furnace vessel provided with trunnion shafts turnably mounting it on a stand and a lip portion that accumulates skull, an improved vessel tilting mechanism comprising: main drive means for providing a source of rotative power, means for operatively connecting said drive means with one of the trunnion shafts for transmitting rotative power to the vessel for a major portion of its turnable operation, a tool adapted to be positioned immediately adjacent the turnable path of the vessel lip portion, and torque assist means operatively associated with one of the trunnion shafts for rotating the vessel lip portion past said tool, and means responsive to an overload condition of said main drive means for controlling the operation of said torque assist means.

14. In metal refining apparatus having a rotatable converter vessel that accumulates skull, and having tool means positioned for engaging the skull during a portion of rotative movement of the vessel, means for affecting deskulling comprising:
  (A) Low torque drive means for rotatably driving the converter vessel to move a skulled portion thereof towards the tool means,
  (B) High torque drive means for rotatably driving the converter vessel to move the skulled portion thereof past said tool means and thereby remove the skull, and
  (C) Means responsive to an overload condition of said low torque drive means for controlling the effective rotative driving operation of said high torque drive means.

15. In a metal refining apparatus employing a furnace vessel that has a pair of trunnion shafts turnably mounting it on stands and that has a lip portion that accumulates skull, and wherein a deskulling tool is positioned for engaging the skull during a portion of the movement of the vessel, an improved vessel tilting mechanism comprising, main driving motor means providing a source of rotative power, means for operatively connecting said main drive motor means with one of the trunnion shafts for transmitting rotative power to the vessel for a major portion of its turnable operation, torque assist means for connection with the other trunnion shaft for turning the lip portion of the vessel past the tool, means for moving said torque assist means into and out of operative connection with the other trunnion shaft, and torque responsive means cooperating with said torque assist means and said means for moving said torque assist means to turn the other trunnion shaft and the lip portion past the tool for effecting a deskulling operation.

16. In a metal refining apparatus as defined in claim 15 wherein, said means for moving said torque assist means into and out of operative connection with the other trunnion shaft comprises a clutch having parts for engagement and disengagement, and a secondary motor for moving said clutch parts into and out of engagement; a source of electricity is connected to said main driving motor means, and said torque responsive means has means sensitive to the flow of current from said source to said main driving motor means for energizing said secondary motor to move said clutch parts into engagement and to energize said torque assist means for turning the other trunnion shaft and the lip portion past the tool.

References Cited by the Examiner

UNITED STATES PATENTS

| | | | |
|---|---|---|---|
| 1,839,602 | 1/32 | Shakely | 64—7 |
| 2,483,017 | 9/49 | McFeaters | 266—36 |
| 2,526,072 | 10/50 | Traser | 64—7 |
| 2,976,090 | 3/61 | McFeaters | 308—207 |
| 3,030,099 | 4/62 | Piatscheck | 248—358 X |

MORRIS O. WOLK, *Primary Examiner.*

JAMES H. TAYMAN, Jr., *Examiner.*